United States Patent [19]

Miyoshi et al.

[11] 4,367,261

[45] Jan. 4, 1983

[54] MAGNETIC RECORDING MEDIUM

[75] Inventors: Takahito Miyoshi; Toshimitu Okutu; Masaaki Fujiyama; Yasuyuki Yamada, all of Odawara, Japan

[73] Assignee: Fuji Photo Film Co., Ltd., Kanagawa, Japan

[21] Appl. No.: 224,237

[22] Filed: Jan. 12, 1981

[30] Foreign Application Priority Data

Jan. 10, 1980 [JP] Japan .................................. 55-1686

[51] Int. Cl.$^3$ ........................ H01F 10/00; B32B 5/16
[52] U.S. Cl. ................................... 428/330; 428/336; 428/425.9; 428/532; 428/694; 428/702; 428/900
[58] Field of Search ............................... 427/127–132, 427/48; 252/62.54; 428/900, 694, 425.9, 329, 330, 336, 702, 323, 532

[56] References Cited

U.S. PATENT DOCUMENTS 4,189,514 2/1980 Johnson ............................... 427/128
4,234,438 11/1980 Horigome et al. .................. 427/128

*Primary Examiner*—Bernard D. Pianalto
*Attorney, Agent, or Firm*—Sughrue, Mion, Zinn, Macpeak & Seas

[57] ABSTRACT

A magnetic recording medium having a magnetic layer and a backing layer on opposite sides of a support is disclosed. The backing layer comprises an inorganic filler dispersed in a binder wherein the binder comprises one or more cellulosic resins, one or more thermoplastic polyurethane elastomers and one or more polyisocyanates.

7 Claims, No Drawings

MAGNETIC RECORDING MEDIUM

BACKGROUND OF THE INVENTION

1. Field of the Invention

This invention relates to a magnetic recording medium, more particularly, to a magnetic tape that has a reduced frictional coefficient, improved running durability and which is free from edge damages without lowering S/N characteristics.

2. Development of the Invention

Magnetic recording tapes for audio, video or computer applications have a magnetic recording layer with a smooth finish to provide improved sensitivity, particularly higher output in the high-frequency range. Magnetic recording tapes having such a smooth finish cannot be uniformly and orderly wound or rewound, so that tension variations during such winding or rewinding reduce its running properties and cause unstable output. In addition, the tape may be easily distorted or damaged.

To eliminate these defects, magnetic recording tapes having a backing layer on the surface of the support thereof opposite the magnetic recording layer have been proposed. However, even such tapes are not without flaws as conventional binders for use in the backing layer, such as vinyl chloride-vinyl acetate-maleic acid copolymers, have low wear resistance and tenacity which reduces tape running durability, and which results in an increased frictional coefficient and waving or creases at the tape edges.

As is generally known, when a magnetic recording medium (especially a magnetic tape) which has a backing layer to provide improved running properties and high running durability is rolled or stacked in sheets, projections and recesses in the backing layer transfer to the surface of the adjacent magnetic layer, thereby damaging the surface characteristics of the magnetic layer to such an extent that the electromagnetic characteristics—especially S/N characteristics—of the magnetic recording medium are impaired.

Further when too great an emphasis is placed on achieving good running properties, the backing layer obtained has so rough a surface that when the magnetic medium is rolled or stacked for storage, the projections and recesses in the backing layer will be transferred to the surface of the magnetic recording layer, and greatly impair the S/N characteristics of the medium.

SUMMARY OF THE INVENTION

Therefore, one object of this invention is to provide a magnetic recording medium that has high tape running durability and is free from increase in frictional coefficient.

Another object of the invention is to provide a backing layer that does not impair the S/N characteristics of a magnetic medium.

These objects of this invention are achieved by a magnetic recording medium wherein a coating layer (or backing layer) comprising a uniform dispersion of a filler powder in a binder comprising one or more cellulosic resins, one or more thermoplastic polyurethane elastomers and one or more polyisocyanates is formed on the surface of a support opposite a magnetic recording layer.

DETAILED DESCRIPTION OF THE INVENTION

Cellulosic resins which can be used in this invention include cellulose derivatives, preferably having 7.5 to 40 wt. % of residual hydroxyl group, such as nitrocellulose. Nitrocellulose having a polymerization degree of 35 to 800 and a nitration degree of 10 to 13 is particularly preferred. Details of these cellulose derivatives are described in U.S. Pat. No. 4,135,016. These derivatives aid in providing the magnetic recording medium with heat resistance, tenacity and antiblocking properties.

In essence, all commercially available products can be used as the thermoplastic polyurethane elastomer. Illustrative materials include polyester polyurethane resins produced by first reacting organic dibasic acids such as phthalic acid, adipic acid, dimerized linoleic acid and maleic acid with glycols such as ethylene glycol, propylene glycol, butylene glycol and diethylene glycol or polyhydric alcohols such as trimethylolpropane, hexanetriol, glycerin, trimethylolethane and pentaerythritol to yield a polyester polyol, and reacting the resulting polyester polyol with a polyisocyanate compound such as tolylene diisocyanate, 4,4'-diphenylmethane diisocyanate, hexamethylene diisocyanate and metaxylylene diisocyanate; polyether polyurethane resins; and resins having a

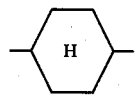

ring in a molecular skeleton of formula (I):

$$[-(O-R-OOC-R'-CO)_{\overline{m}}-OROOCNH-R'-NHCO-]\quad (I)$$

wherein m is an integer of 5 to 100; R is a bivalent group introduced by an alicyclic or aromatic compound having at least two hydroxyalkyl groups having 1 to 4 carbon atoms or at least two hydroxyalkoxyl groups having 1 to 4 carbon atoms; R' is

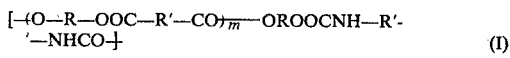

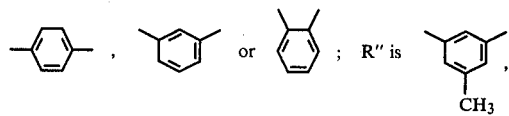

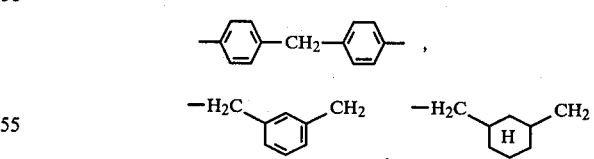

or $-(CH_2)-n$ where n is an integer of 4 to 6; and typical terminal group of the resins is hydroxy group.

Effective polyurethane elastomers have a molecular weight of from about 5,000 to about 500,000, preferably 10,000 to 200,000. Details of these polyurethane elastomers are described in Japanese Patent Application (OPI) No. 122234/80.

Suitable examples of polyisocyanates for use in this invention include 2,4-tolylene diisocyanate, 1,6-hexamethylene diisocyanate and triisocyanate (e.g., "Coronate L" of Nippon Polyurethane Industry Co., Ltd.).

The preferred composition of the binder which is the characteristic feature of this invention is such that 100 parts by weight of the binder comprises about 20 to about 80 parts by weight (particularly preferably 30 to 60 parts by weight) of the one or more cellulosic resins, about 20 to about 50 parts by weight (particularly preferably 30 to 40 parts by weight) of the one or more thermoplastic polyurethane elastomers, and about 10 to about 50 parts by weight (particularly preferably 20 to 40 parts by weight) of the one or more polyisocyanates.

A filler is used in the backing layer to control the surface roughness and electrical resistance. Examples of the filler include carbon black powder, graphite, tungsten disulfide, molybdenum disulfide and boron nitride, as well as other inorganic powders such as $SiO_2$, $CaCO_3$, $Al_2O_3$, $Fe_2O_3$, $TiO_2$, MaO, ZnO or CaO. Of these, calcium carbonate is particularly preferred, and a specific example thereof is Homocal D of Shiraishi Kogyo Co., Ltd. which has a high affinity for the binder used in this invention and which is highly dispersible in the binder. The weight ratio of the one or more fillers to binder is in the range of from about 1 to about 4, preferably from 2 to 3.

The backing layer may further contain a lubricant to decrease the frictional coefficient of the backing layer and to improve the running properties and running durability of the magnetic recording medium. Suitable lubricants are aliphatic acids having 12 or more carbon atoms, esters thereof, silicones and paraffin wax. Aliphatic acids having 18 to 22 carbon atoms are preferred. Examples of lubricants include ethyl myristate, ethyl palmitate, ethyl stearate, butyl myristate, butyl palmitate, butyl stearate, and $Si(CH_3)_3-O+Si(CH_3)_2O+_{\overline{p}} Si(CH_3)_3$ (wherein p is an integer of 2 to 10) which may be modified with an aliphatic acid e.g., myristic acid, capric acid, behenic acid and oleic acid. The lubricant is preferably added in an amount of about 2.5 to 20 parts by weight per 100 parts by weight of the binder.

The backing layer has a thickness of about 3 microns or less, preferably a thickness between 0.5 and 2 microns. A thickness in the range of from 0.5 to 1.0 micron is particularly preferred as a backing layer that insures minimum transfer of the projections and recesses on its surface onto an adjacent magnetic layer without compromising the S/N characteristics of the magnetic recording medium.

To prevent transfer of the surface projections and recesses onto the magnetic layer, the backing layer must also have small surface roughness. As a result of our studies on the surface roughness that meets this purpose, we have found that when the surface roughness of the magnetic layer is less than 0.02 microns in terms of center-line average roughness (Ra), the surface roughness of the backing layer must also be less than 0.024 microns of Ra.

Accordingly, the size of the filler contained in the backing layer is desirably small so long as good running properties of the magnetic recording medium is retained, but at the same time, according to our findings, the thickness of the backing layer also has a great effect on the surface characteristics of the magnetic layer, and the backing layer desirably has a small thickness so long as good running properties and good running durability are retained.

As a result of our studies on the thickness of the backing layer that meets these requirements, we have found that a thickness of about 0.5 to about 2 microns, preferably 0.5 to 1.0 micron, is suitable.

The production of a backing layer that has no effect on the surface characteristics of the magnetic layer calls for a careful selction of the type and the form of the filler contained in the backing layer. While carbon black and the inorganic fine particles mentioned above can be used as the filler, care must be taken to select the proper size, hardness and form. A filler having an average size of about 0.01 to about 0.5 microns is preferred, and a size between 0.02 and 0.1 microns is particularly preferred. Too hard a filler is not preferred, and a filler having a hardness of about 2 to about 4 on the Mohs' hardness scale is desired, and a hardness between 2.5 and 3.5 is particularly desired. A filler may be graular or acicular form.

This invention will now described in greater detail by reference to the following examples and comparative example which are presented here for illustrative purposes only and by no means are intended to limit the scope of the invention. In the examples and comparative example, all parts are by weight.

EXAMPLE 1

A coating composition was prepared by thoroughly mixing the ingredients (specified below) in a ball mill:

| | |
|---|---|
| Nitrocellulose | 30 (parts) |
| Polyurethane (Nipporan 2301 of Nippon Polyurethane Industry Co., Ltd.) | 15 |
| Polyisocyanate (Coronate L of Nippon Polyurethane Industry Co., Ltd.) | 25 |
| $CaCO_3$ powder | 150 |
| Methyl ethyl ketone | 300 |

The above coating composition was applied to one side of a magnetic recording tape having a magnetic recording layer on the other side, and dried to form a backing layer 0.8 to 1.0 micron thick.

EXAMPLE 2

A magnetic tape was prepared by repeating the procedure of Example 1 except that the coating composition was as follows:

| | |
|---|---|
| Nitrocellulose | 15 (parts) |
| Polyurethane (Nipporan 2301 of Nippon Polyurethane Industry Co., Ltd.) | 30 |
| Polyisocyanate (Coronate L of Nippon Polyurethane Industry Co., Ltd.) | 25 |
| $CaCO_3$ powder | 150 |
| Methyl ethyl ketone | 300 |

EXAMPLE 3

A magnetic tape was prepared by thoroughly mixing the ingredients (specified below) in a ball mill:

| | |
|---|---|
| Nitrocellulose | 35 (parts) |
| Polyurethane (Nipporan 2301 of Nippon Polyurethane Industry Co., Ltd.) | 20 |
| Polyisocyanate (Coronate L of Nippon Polyurethane Industry Co., Ltd.) | 45 |
| $CaCO_3$ powder (Homocal D of Shiraishi Kogyo Co., Ltd.) | 240 |
| Stearic acid | 5 |
| Methyl ethyl ketone | 480 |

The coating composition was applied to the side of a magnetic recording tape opposite the magnetic recording layer thereof, and dried to form a backing layer 0.8 to 1.0 micron thick.

EXAMPLE 4

A magnetic tape was prepared by repeating the procedure of Example 1 except that the coating composition was as follows:

| | |
|---|---|
| Nitrocellulose | 35 (parts) |
| Polyurethane (Nipporan 2301 of Nippon Polyurethane Industry Co., Ltd.) | 20 |
| Polyisocyanate (Coronate L of Nippon Polyurethane Industry Co., Ltd.) | 45 |
| CaCO₃ powder (Homocal D of Shiraishi Kogyo Co., Ltd.) | 240 |
| Erucic acid | 5 |
| Methyl ethyl ketone | 480 |

EXAMPLE 5

A magnetic tape was prepared by repeating the procedure of Example 1 except that the coating composition was as follows:

| | |
|---|---|
| Nitrocellulose | 35 (parts) |
| Polyurethane (Nipporan 2301 of Nippon Polyurethane Industry Co., Ltd.) | 20 |
| Polyisocyanate (Coronate L of Nippon Polyurethane Industry Co., Ltd.) | 45 |
| CaCO₃ powder (Homocal D of Shiraishi Kogyo Co., Ltd.) | 240 |
| Methyl ethyl ketone | 480 |

COMPARATIVE EXAMPLE

A magnetic tape was prepared by repeating the procedure of Example 1 except that the coating composition was as follows:

| | |
|---|---|
| Vinyl chloride-vinyl acetate-maleic acid copolymer (400X-110A of Nippon Zeon Co., Ltd.; molar ratio of vinyl chloride:vinyl acetate:maleic acid 87:8:5; molecular weight about 28,000) | 30 (parts) |
| Polyurethane (Nipporan 2301 of Nippon Polyurethane Industry Co., Ltd. | 15 |
| Polyisocyanate (Coronate L of Nippon Polyurethane Industry Co., Ltd.) | 25 |
| CaCO₃ powder | 150 |
| Methyl ethyl ketone | 300 |

The six tape samples obtained in Examples 1 to 5 and Comparative Example—identified as Samples A to E and Comparative Example F, respectively—were subjected to three tests as described below, and the results obtained are set forth in the following table.

Test 1

The running durability of a virgin tape was compared with that of a tape that had been subjected to 100 runs. The running durability was represented by $T_2/T_1$ wherein $T_1$ was the tape tension at the entrance to the rotary cylinder of a VHS video deck and $T_2$ the tension at the exit.

The output from a VHS video deck using the virgin tape was compared with the output from the deck using the same tape which had been subjected to 100 runs; output variations were compared.

Test 2

The coefficient of friction of a virgin tape against the stainless steel tape guide pole of a VHS video deck (tape speed: 3.3 cm/sec) was measured for both the magnetic layer side and the backing layer side. The same measurement was made with respect to the same tape which had been subjected to 100 runs.

Test 3

A virgin tape was subjected to 100 runs on a VHS video deck; wear of the backing layer and any damage to the tape was examined.

| | | | Sample A | Sample B | Sample C | Sample D | Sample E | Comp. Sample F |
|---|---|---|---|---|---|---|---|---|
| Output Variation After 100 Tape Runs (dB) | | | 0.2 | 0.4 | 0.1 | 0.1 | 0.4 | 1.2 |
| Virgin Tape Tension on Deck ($T_2/T_1$) | | | 75/35 | 95/40 | 68/35 | 70/35 | 95/40 | 100/40 |
| Tape Tension of Deck ($T_2/T_1$) After 100 Runs | | | 70/35 | 95/40 | 68/35 | 70/35 | 95/40 | 95/35 |
| Room Temp. and Normal Humidity | Virgin Tape Friction Coefficient | Magnetic Surface | 0.29 | 0.33 | 0.25 | 0.25 | 0.34 | 0.35 |
| | | Back Surface | 0.15 | 0.22 | 0.13 | 0.13 | 0.24 | 0.22 |
| | Friction Coefficient After 100 Tape runs | Magnetic Surface | 0.28 | 0.33 | 0.25 | 0.25 | 0.32 | 0.33 |
| | | Back Surface | 0.13 | 0.22 | 0.13 | 0.13 | 0.22 | 0.20 |
| Room Temp. and High Humidity (85% RH) | Virgin Tape Friction Coefficient | Magnetic Surface | 0.33 | 0.35 | 0.28 | 0.30 | 0.35 | 0.40 |
| | | Back Surface | 0.19 | 0.25 | 0.15 | 0.17 | 0.25 | 0.28 |
| | Friction Coefficient After 100 Tape Runs | Magnetic Surface | 0.33 | 0.35 | 0.28 | 0.30 | 0.34 | 0.38 |
| | | Back Surface | 0.19 | 0.25 | 0.15 | 0.17 | 0.24 | 0.27 |
| Wear | | | Very Small | Very Small | Very Small | Very Small | Very Small | High |
| Tape Damage (edge crease, edge waving) | | | None | Very Few | None | None | Very Few | Many |

It can be seen from the results that a magnetic tape having a backing layer containing nitrocellulose has good running durability and in particular, higher content of nitrocellulose in the backing layer results in better running durability.

While the invention has been described in detail and with reference to specific embodiments thereof, it will be apparent to one skilled in the art that various changes and modifications can be made therein without departing from the spirit and scope thereof.

What is claimed is:

1. In a magnetic recording medium comprising a support having a magnetic layer and a backing layer on opposite sides of said support, the backing layer comprising an inorganic filler disbursed in a binder, the improvement wherein the binder consists essentially of one or more cellulosic resins, one or more thermoplastic polyurethane elastomers and one or more polyisocyanates, and wherein said backing layer has a thickness in the range of from about 0.5 to about 1.0 micron, and wherein the surface roughness of said backing layer is less than 0.024 microns expressed as center-line average roughness and the surface roughness of said magnetic layer is less than 0.02 microns expressed as center-line average roughness.

2. A magnetic recording medium according to claim 1 wherein the surface roughness of the magnetic layer is less than 0.02 micron expressed as center-line average roughness, the surface roughness of the backing layer is less than 0.024 micron expressed as center-line average roughness, the thickness of the backing layer is between 0.5 and 1 micron, the backing layer comprising calcium carbonate having an average particle size of 0.02 to 0.1 micron dispersed in the binder comprising nitrocellulose, one or more thermoplastic polyurethane elastomers and one or more polyisocyanate.

3. A magnetic recording medium according to claim 1 wherein the backing layer contains 2.5 to 20 parts by weight of an aliphatic acid of 18 to 22 carbon atoms per 100 parts by weight of the binder.

4. A magnetic recording medium according to claim 1 wherein the filler in the backing layer has an average particle size in the range of from 0.02 to 0.1 micron.

5. A magnetic recording medium according to claim 1 wherein the filler in the backing layer has a hardness between 2.5 and 3.5 on the Mohs' scale of hardness.

6. A magnetic recording medium according to claim 1 wherein the filler in the backing layer is calcium carbonate.

7. A magnetic recording medium according to claim 1 wherein the cellulosic resin contained in the binder is nitrocellulose.

* * * * *